United States Patent
Rhodes et al.

(10) Patent No.: US 6,236,768 B1
(45) Date of Patent: May 22, 2001

(54) METHOD AND APPARATUS FOR AUTOMATED, CONTEXT-DEPENDENT RETRIEVAL OF INFORMATION

(75) Inventors: Bradley J. Rhodes; Thad E. Starner; Pattie E. Maes, all of Cambridge; Alex P. Pentland, Lexington, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/071,312

(22) Filed: May 1, 1998

Related U.S. Application Data
(60) Provisional application No. 60/062,111, filed on Oct. 14, 1997.

(51) Int. Cl.[7] .................................................. G06K 9/54
(52) U.S. Cl. .......................... 382/306; 382/155; 382/229; 707/1
(58) Field of Search .................................. 382/305–306, 382/105, 155–159, 224–229; 707/1–3, 6, 200

(56) References Cited

U.S. PATENT DOCUMENTS

| | | | |
|---|---|---|---|
| 5,422,828 | * 6/1995 | Choate et al. | 342/458 |
| 5,497,489 | 3/1996 | Menne . | |
| 5,546,502 | 8/1996 | Hart et al. | 395/12 |
| 5,572,726 | * 11/1996 | Hasuo | 707/200 |
| 5,586,316 | * 12/1996 | Tanaka et al. | 707/4 |
| 5,619,709 | 4/1997 | Caid et al. . | |

OTHER PUBLICATIONS

P.E. Hart and J.M. Graham, "Query–Free Information Retrieval," Proceedings of the Second International Conference on Cooperative Information Systems, Toronto, pp. 36–46 1994.

Jennings, et al., *IEICE Transac. on Info. and Systems* E75–D:198–209 (1992).

Bradley J. Rhodes, "Remembrance Agent. A continuously running automated information retrieval system", *The proceedings of The First Conference on the Practical Application of Intelligent Agents and Multi Agent Technology*, PAAM, pp. 487–495, (1996).

* cited by examiner

Primary Examiner—Jose L. Couso
Assistant Examiner—Gregory Desire
(74) Attorney, Agent, or Firm—Testa, Hurwitz & Thibeault LLP

(57) ABSTRACT

Documents stored in a database are searched for relevance to contextual information, instead of (or in addition to) similar text. Each stored document is indexed in term of meta-information specifying contextual information about the document. Current contextual information is acquired, either from the user or the current computational or physical environment, and this "meta-information" is used as the basis for identifying stored documents of possible relevance.

24 Claims, 1 Drawing Sheet

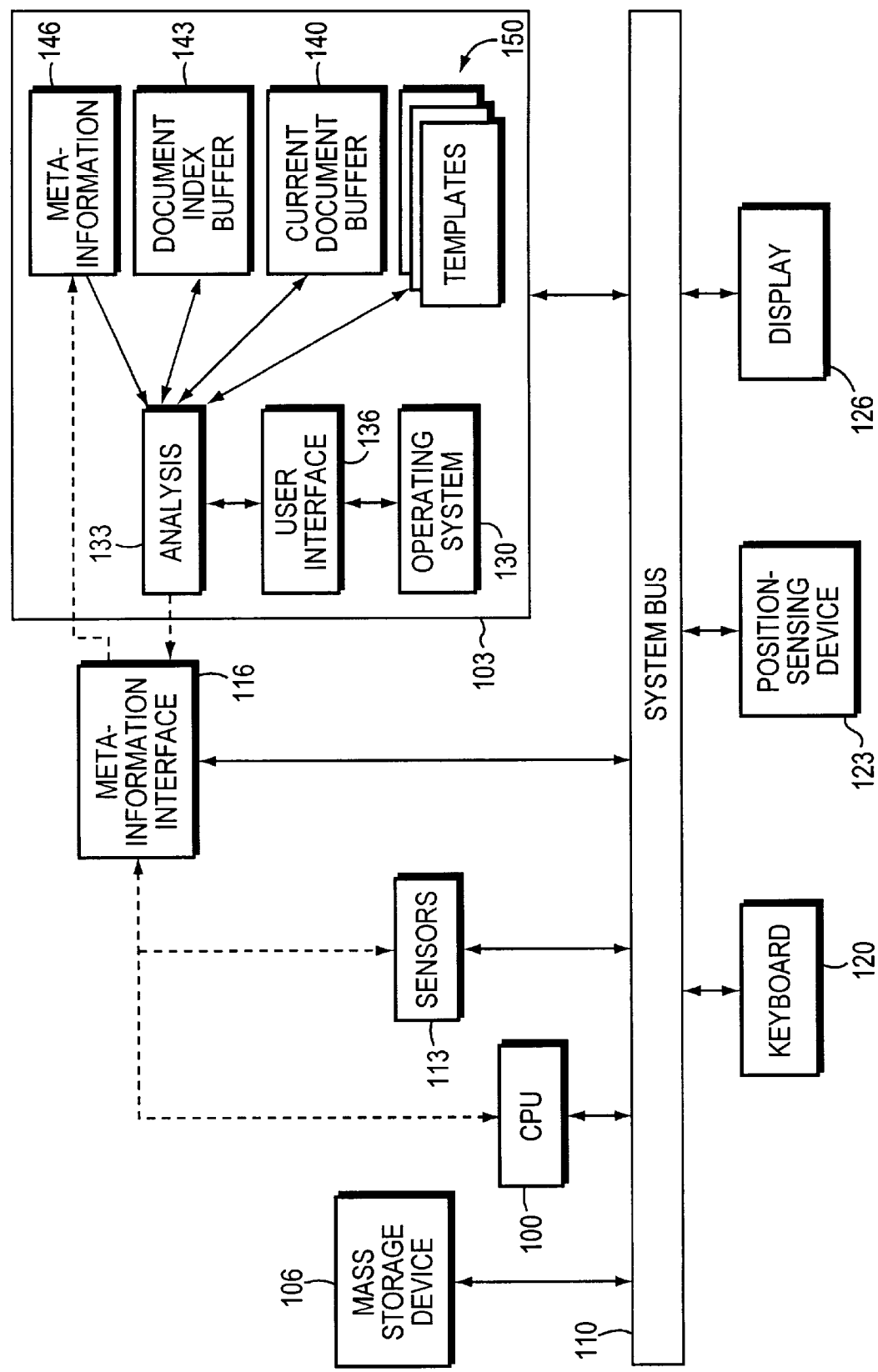

METHOD AND APPARATUS FOR AUTOMATED, CONTEXT-DEPENDENT RETRIEVAL OF INFORMATION

RELATED APPLICATION

This application is based upon and claims priority from U.S. provisional application Ser. No. 60/062,111, filed Oct. 14, 1997.

BACKGROUND OF THE INVENTION

The tremendous amounts of information now available even to casual computer users, particularly over large computer networks such as the Internet, have engendered numerous efforts to ease the burden of locating, filtering, and organizing such information. These include classification and prioritization systems for e-mail (see, e.g., Maes, *Commun. of ACM* 37(7):30–40 (1994); Cohen, "Learning Rules that Classify E-mail," *AAAI Spring Symposium on Machine Learning in Information Access*, March 1996), systems for filtering news downloaded from the Internet (see, e.g., Lang, "NewsWeeder: Learning to Filter Netnews," *Machine Learning: Proc. of 12th Int'l Conf.* (1995)), and schemes for organizing user-specific information such as notes, files, diaries, and calendars (see, e.g., Jones, *Int'l J. of Man-Machine Studies* 25 at 191–228 (1986); Lamming et al., "Forget-me-not: Intimate Computing in Support of Human Memory," *Proc. FRIEND21, '94 Int'l Symp. on Next Generation Human Interface* (1994)).

Systems designed for information retrieval generally function in response to explicit user-provided queries. They do not, however, assist the user in formulating a query, nor can they assist users unable or unwilling to pose them. The Remembrance Agent ("RA"), described in Rhodes et al., *Proc. of 1st Int'l Conf. on Practical Application of Intelligent Agents and Multi-Agent Technology* at 487–495 (1996), is a computer progran that watches what a user is typing in a word processor (specifically the Emacs UNIX-based text editor) and continuously displays a list of documents that might be relevant to the document currently being written or read. For example, if a journalist is writing a newspaper article about a presidential campaign, the RA might suggest notes from a recent interview, an earlier article about the campaign, and a piece of e-mail from her editor suggesting revisions to a previous draft of the article.

The utility of the RA stems from the fact that currently available desktop computers are fast and powerful, so that most processing time is spent waiting for the user to hit the next keystroke, read the next page, or load the next packet off the network. The RA utilizes otherwise-wasted CPU cycles to perform continuous searches for information of possible interest to the user based on current context, providing a continuous, associative form of recall. Rather than distracting from the user's primary task, the RA serves to augment or enhance it.

The RA works in two stages. First, the user's collection of text documents is indexed into a database saved in a vector format. These form the reservoir of documents from which later suggestions of relevance are drawn; that is, stored documents will later be "suggested" as being relevant to a document currently being edited or read. The store documents can be any sort of text document (notes, Usenet entries, webpages, e-mail, etc.). This indexing is usually performed automatically every night, and the index files are stored in a database. After the database is created, the other stage of the RA is run from Emacs, periodically taking a sample of text from the working buffer. The RA finds documents "similar" to the current sample according to word similarities; that is, the more times a word in the current sample is duplicated in a candidate database document, the greater will be the assumed relevance of that database document. The RA displays one-line summaries of the best few documents at the bottom of the Emacs window. These summary lines contain a line number, a relevance ranking (from 0.0=not relevan to 1.0=extremely relevant), and header information to identify the document. The list updated at a rate selectable by the user (generally every few seconds), and the system is configured such that the entirety of a suggested document can be brought up by the user pressing the "Control-C" key combination and the line number to display.

Briefly, the concept behind the indexing scheme used in RA is that any given document may be represented by a multidimensional vector, each dimension or entry of which corresponds to a single word and is equal in magnitude to the number of times that word appears in the document. The number of dimensions is equal to the number of allowed or indexed words. The advantages gained by this representation are relatively speedy disk retrieval, and an easily computed quantity indicating similarity between two documents: the dot product of their (normalized) vectors.

The RA creates vectors in three steps:

1. Removal of common words (called stop words), identified in a list of stop words.

2. Stemming of words (changing "jumped" and "jumps" to "jump," for example This is preferably accomplished using the Porter stemming algorithm, a standard method in the text-retrieval field.

3. Vectorization of the remaining text into a "document vector" (or "docvec"). Conceptually, a docvec is a multidimensional vector each entry of which indicates the number of times each word appears in the document.

For example, suppose a document contains only the words: "These remembrance agents are good agents."

Step 1: Remove stop words
This converts the text to "Remembrance agents good agents"

Step 2: Stem words
This converts the text to "remembrance agent good agent"

Step 3: Make the document vector
This produces the vector:
000 ... 121 ... 000

Each position in the vector corresponds to an allowed word. The zeroes represent all allowed words not actually appearing in the text. The non-zero numerals indicate the number of times the corresponding word appears, e.g., a 1 for the words "good" and "remembr," and a 2 for the word "agent"; thus, the numbers indicate the document "weight" for the word in question.

Step 4: Normalize the vector
Document vectors are normalized (i.e., divided by the magnitude of the vector). The vector magnitude is given by the square root of the sum of the squared weights. (In fact, the normalization step takes place in the context of other computations, as described more fully below.) Normalization facilitates meaningful comparison between the words in a query and the words in a document in terms of their relative importance; for example, a word mentioned a few times in a short document carries greater significance than the same word mentioned a few more times in a very long document.

In a more recent implementation of the RA, a fifth step is added to improve the is quality of matching beyond that attainable based solely on term frequency. In this fifth step, vectors are weighted by the inverse of the document frequency of the term, based c the assumption that words occurring frequently in a document should carry more weight than words occurring frequently in the entire indexed corpus (which are less distinguishing). More rigorously, the similarity between two word vectors is found by multiplying the document term weight (DTW) for each term by the query term weight (QTW) for th term, and summing these products:

$$\text{relevance} = \Sigma DTW \cdot QTW \text{ where}$$

$$DTW = \frac{tf \cdot \log\frac{N}{n}}{\sqrt{\Sigma_{vector}\left(tf_i \cdot \log\frac{N}{n_i}\right)^2}} \text{ and}$$

$$QTW = \frac{\left(0.5 + \frac{0.5tf}{\max_{tf}}\right) \cdot \log\frac{N}{n}}{\sqrt{\Sigma_{query}\left(\left(0.5 + \frac{0.5tf_i}{\max_{tf}}\right) \cdot \log\frac{N}{n_i}\right)^2}}$$

The document term weight is computed on a document-by-document basis for each indexed word in the document vector. Because it does not change until new documents are added to the corpus, these computations may take place only when the corpus is indexed and re-indexed. The summation in the denominator covers all words in the document vector (i.e., all indexed words) that also appear in the current document for which DTW is computed (since a summation term is zero otherwise); this facilitates normalization. The term frequency tf refers to the number of times a particular term appears in the current document; N is the total number of documents in the corpus; and n is the number of documents in which the term appears. The summation is taken over each indexed word (the first through the ith) in the document. The DTW of a term within a document, then, reflects the number of times it appears within the document reduced in proportion to its frequency of appearance throughout all documents.

The QTW is computed for each word (the first through the ith) in the query vector. In this case, tf refers to the number of times the word appears in the query vector, and max tf refers to the largest term frequency for the query vector. If the document term weight is greater than the query term weight, then the former is lowered to match the query term weight (in order to prevent short documents from being favored).

The RA, running within Emacs, takes a sample of text every few seconds from current document being edited. This text sample is converted into a vector (called a "query vector") by the four-step process set forth above. After computing the query vector, the RA computes the dot product of the query vector with every indexed document This dot product represents the "relevance" of the indexed document to the current sample text, relevance being measured in terms of word matches. One-line summaries of the top few most relevant documents are listed in the suggestions list appearing at the bottom of the Emacs window (the exact number displayed is customizable by the user).

Documents to which sampled text is compared need not be entire files. Instead for example, files can be divided into several "virtual documents" as specified in a template file. Thus, an e-mail archive might be organized into multiple virtual documents each corresponding to a piece of e-mail in the archive. Alternatively, one can index a file into multiple "windows" each corresponding to a portion of the file, such that, for example, each virtual document is only 50 or so lines long, with each window overlapping its neighbors by 25 lines. (More specifically, In this representation, window one includes lines 0–50 of the original document, window two includes lines 25–75, etc.) This format makes it possible to suggest only sections of a long document, and to jump to that particular section when the entirety of the document is brought up for viewing.

Experience with the RA has shown that actually performing a dot product with each indexed document is prohibitively slow for large databases. In preferred implementations, therefore, document vectors are not stored; instead, word vectors are stored. The "wordvec" file contains each word appearing in the entire indexed corpus of documents followed by a list of each document that contains that particular word. The documents are represented by an integer value (generally 4 bytes) encoding both the document nun ber and the number of times that word appears in that particular document. The wordvec file format is as follows:

| (int) | (width*uns int) | (int) | (uns int) | (uns int) | (uns int) |
|---|---|---|---|---|---|
| NUM_WORDS, | WORDCODE-1, WORDCODE-2, etc. | NUM_DOCS=N1, NUM_DOCS=N2, | DOC-1, DOC-1, | DOC-2, ..., DOC-2, ..., | DOC-N1, DOC-N2, |

The headings indicate the type of data each variable represents (integer, unsigned integer). The first entry in the wordvec file, NUM_WORDS, is the number of words ap pearing in the entire file. Each word in the wordvec is represented by a unique numerical code, the "width" indicating the number of integers in the code (the RA uses two integers per code). The NUM_DOCS field indicates the number of documents containing the word specified by the associated wordcode. The word-count variables DOC-1, DOC-2, . . . , DOC-N1 each correspond to a document containing the word, and reflect the numb of occurrences of the word divided by the total number of words in the the document.

A word offset file contains the file offsets for each word in the wordvec file, and is used to overcome the difficulties that would attend attempting to locate a particular wordcode in the wordvec file. Because each wordcode in the wordvec file can be associated with an arbitrary number of documents, locating a particular wordcode would require searching wordcode by wordcode, jumping between wordcodes separated by the arbitrary numbers of intervening word-count variables. To avoid this, a "wordvec offset" file is used to specify the location of each wordcode in the wordvec file.

| (width*uns int)            | (long)    |
|----------------------------|-----------|
| WORDCODE-1,                | OFFSET-1, |
| WORDCODE-2,                | OFFSET-2, |
| etc.                       |           |

Since each entry has a fixed length, it is possible to perform rapid binary searches on the wordvec offset file to locate any desired wordcode.

Accordingly, for each word in the query vector, the RA first looks up the word in the word offset file, and from that the word's entry is looked up in the wordvec file. An array of document similarities is used to maintain a running tally of documents and their similarities, in terms of numbers of word matches, to the query vector. The array is sorted by similarity, with the most similar documents at the top of the list. Similarity is computed for each word in the query vector by taking the product of the query-vector entry and the weight of each document in the corresponding wordvec file. To normalize this product, it is then divided by the query-vector magnitude (computed in the same manner as the document magnitude) and also by the document magnitude. The final value is added to the current running-total similarity for that document, and the process repeated for the next word in the query. In summary, the query vector is analyzed wordcode by wordcode, with the similarities array indicating the relevance to the query of each document.

When computing the similarity of a query to an indexed document, it is preferred to employ a "chopping" approach that prevents an indexed word in a document from having a higher weight than the word has in the query vector. If the weight of the word in the indexed document is higher than its weight in the query vector, the document weight gets "chopped" back to the query's value. This approach avoids situations where, for example, a query containing the word "spam" as just a single unimportant word will not get overwhelmingly matched to one-word documents (which have the highest possible eight) or documents like "spam spam spam spam eggs bacon spam. . ." This method is slower on indexing and the index files take more space, but is much faster on retrieval because only documents containing words in the query are even examined.

The other files created on indexing are a location file (doc_locs) containing a mapping between document number and filename for that document, a titles file containing the information for the one-line summary (titles), offset files for doc_locs and titles (dl_offs and t_offs) to do quick lookups, and a window-offset file specifying where to jump in a file for a particular portion of a windowed document.

While the RA offers substantial capabilities for automated, "observational" retrieval, the cues it utilizes to identify possibly relevant documents are limited to word similarities. This is adequate for many computational tasks and clearly suits the traditional desktop environment of everyday computing: if the user is engaged in a word-related computational task, word-based cues represent a natural basis for relevance determinations. In other words, the current information reliably indicates the relevance of similar information. More broadly, however, human memory does not operate in a vacuum of query-response pairs. Instead, the context as well as the content of a remember episode or task frequently embodies information bearing on its relevance to later experience; the context may include, for example, the physical location of an event, who was there, what was happening at the same time, and what happened immediately before and after.

As computer components grow smaller and less expensive, so-called "wearable" computers that accompany the user at all times become more feasible. Users will perform an ever-increasing range of computational tasks away from the desktop and in the changing environmental context of everyday life. Consequently, that changing context) will become more relevant for recall purposes. Even now, inexpensive laptop computers allow users to monitor their physical locations via global-positioning systems ("GPSs") or infrared ("IR") beacons, and to access various kinds of environmental sensors or electronic identification badges. Since information is created in a particular context, the atributes of that context may prove as significant as the information itself in determining relevance to a future context.

Contextual "meta-information" is not limited to physical surroundings. Even in traditional desktop environments, where for practical purposes the physical context remains constant, meta-information such as the date, the time of day, the day of the week, or the general subject can provide cues bearing on the relevance of information (regardless of, or more typically in addition to, the content of the information itself). Word-based searching and retrieval systems such as the RA are incapable of capturing these meta-informational cues.

SUMMARY OF THE INVENTION

The present invention improves on the RA by extending its comparative capabilties beyond word similarities. The invention monitors various aspects of the user's computational and/or physical environment, and utilizes these as bases for relevance suggestions. Accordingly, unlike the RA, the "context" for assessing relevance is not what the user is typing, but can instead be any kind of information about the user's current situation. Examples include the user's current location (room or GPS location), the time of day, the day of the week, the date, the subject being discussed, person being talked to, etc. In this way, the invention can remind a user of personal information relevant to the current environment, or use environmental cues in effect as search vectors in a broader search that extends beyond these cues. As a result, the invention can be implemented only in the traditional computing environment in which RA operates, but also in fundamentally different environments. For example, the invention may be implemented as wearable or portable memory aid.

In the RA, only the words within an indexed document are used to determine relevance. In accordance with the present invention, by contrast, these documents may be associated with a wide range of meta-information (i.e., information about the information), and it is this meta-information that is used to determine relevance—either alone or, if desired, in combination with the lexical comparisons implemented by RA. Meta-information about a document can be entered explicitly by a user, can be tagged automatically when the information is first created, or can be generated by analyzing the structure of the document. For example, if a student were writing notes in class, she could explicitly write the current date in a special header at the top of the notes; the date would then function as meta-information searchable by the present invention. Alternatively, the notes might automatically be tagged with the date based on the system clock. Finally, if the notes were instead e-mail, the e-mail would already bear a timestamp, so a system configured to recognize the structure of an e-mail document could glean the date the mail was sent from the existing e-mail header without modification or special handling.

Meta-information useful in the context of the present invention can include far more than just date, of course, and the invention works best if several different kinds of meta-information are available. Some examples illustrate various forms of meta-information and their relevance to the capabilities of the present invention:

Scenario #1: A student takes notes in class, and as her notes are saved as files, they are automatically tagged with several pieces of meta-information, including the room in which the notes were taken, the date, the day of the week, and the time of day. As she enters the classroom a week later, an infrared (IR) beacon broadcasts the room number to her wearable computer. The time of day and day of the week are also available to the computer from its system clock, and the invention automatically brings up the previous week's class notes as a "relevant" document on her computer.

Scenario #2: A salesman is at a trade show and meets a potential client at the booth. He does not recognize the client, but the trade show has supplied everyone with name badges that also broadcast the person's name via an IR carrier beacon. The salesman's wearable computer receives that information from the potential client, and matches the person name to a note file written two years ago at a previous trade show. The notes concerned a previous meeting in which the potential client had listed his needs and business plans for the future; since at that previous meeting there were no active badges, the salesman had explicitly tagged the note with the person's name by typing it in. Because of the name match, the invention now displays the relevant information on his eyeglass-mounted computer display, allowing him to make a more focused sales pitch.

Scenario #3: A tourist is visiting Seattle for the first time, and his car is equipped with a dashboard computer running the invention. As he drives around, the invention brings up notes from his wife's previous trip to Seattle, based on the location supplied from the car's global-positioning system and the time of day. He winds up going to a restaurant in which his wife had entered the note "Great place for lunch—try the fish."

Scenario #4: A businesswoman has indexed her day-planner files, and the invention has gleaned the dates, times, and locations for appointments from the structured files. The invention reminds her of the time for her dentist appointment as this draws near. When she drives by the grocery store on the way back from the dentist, however, her location (supplied by GPS) triggers the invention to automatically remind her of her calendar entry "get birthday cake [Quality Foods]." In this case, the calendar entry was tagged both with a date and a machine-readable location.

Accordingly, in a first aspect, the invention provides an apparatus for context-based document identification. The apparatus, ordinarily implemented on a programmable computer, includes a database for indexing a plurality of documents in terms of meta-information that specifies contextual information about the document or its contents; means for acquiring current contextual information (e.g., regarding a user's physical or computational environment); means for searching the database to locate documents whose meta-information is relevant to the current contextual information; and means for reporting the identified documents to the user.

In a second aspect, the invention comprises a method of identifying document from a stored document database in response to contextual information. The method comprises indexing each stored document in terms of meta-information specifying contextual information about the document; acquiring current contextual information; identifying stored documents whose meta-information comprises information relevant to the current contextual information; and reporting the located documents to the user.

BRIEF DESCRIPTION OF THE DRAWING

The detailed description below refers to the accompanying drawing, which illustrates a representative hardware platform for practicing the invention.

DETAILED DESCRIPTION OF AN ILLUSTRATIVE EMBODIMENT

While the present invention can utilize any kind of meta-information about a document, certain kinds of sensors are particularly preferred. It should be stressed, however, that meta-information need not be provided by physical or computational sensors, but instead may be entered explicitly by the user, or through analysis of the structure of the document currently being indexed (or viewed by the user). Furthermore, the term "document" need not connote or be limited to a traditional text file; instead, the context-based approach of the present invention can be used to identify materials such as images, video or audio (either explicitly or automatically recorded) not easily searchable by conventional means.

A representative list of meta-information items useful in accordance with the present invention, along with potential sources and the meaning attributable to the meta-information, is as follows:

| | |
|---|---|
| Meta-information: | LOCATION |
| Supplied by: | IR beacon, GPS, human-entered, included in document |
| Meaning: | Place where note was taken, information regarding this place |
| Meta-information: | PERSON |
| Supplied by: | IR-transmitting name tag, human-entered, video face-recognition, biometrics (voice-print), included in document (e.g., "from" field in e-mail) |
| Meaning: | Person/people who were there when note was taken, information regarding this person; person/people otherwise associated with document (e.g., author) |
| Meta-information: | DATE (e.g., date and timestamp) |
| Supplied by: | System clock, included in document (e.g., calendar entry), entered by person |
| Meaning: | Date/time when note was taken, information regarding this time |
| Meta-information: | TIME-OF-DAY |
| Supplied by: | System clock, included in document (e.g. calendar entry), entered by person |
| Meaning: | Time-of-day when note was taken, information is regarding this time |
| Meta-information: | DAY-OF-WEEK |
| Supplied by: | System clock, included in document (e.g. calendar entry), entered by person |
| Meaning: | Day of week when note was taken, information is regarding this day of the week. |
| Meta-information: | SUBJECT |
| Supplied by: | Included in document (e.g., subject line in e-mail, or key words in technical paper), entered by person, speech-recognition software doing word spotting |
| Meaning: | This is the subject of a piece of information, or the subject of a current conversation or discussion |
| Meta-information: | DOMAIN-SPECIFIC INFO/OTHER |
| Supplied by: | Variable |
| Meaning: | Many specific applications have special kinds of information that may be used as meta-information. For example, a shopper might be interested in products names. When the shopper passes an item on the shelf at the supermarket, the invention might remind him that that product is on his shopping list. |

-continued

| Meta-information: | Text being edited, text on screen |
|---|---|
| Supplied by: | Current computational situation (on screen) |
| Meaning: | This information is not really meta-information, but is rather the information itself, vectorized in the same way the RA vectorizes information. This information may be treated the same as any other sensory information. |

Many kinds of meta-information, such as people's names, can be represented as strings of words. Such information is considered "discrete," in the sense that a person either is or is not Jane Doe, and if she is not Jane Doe she cannot be "a close second." Other kinds of information are "continuous," such as times or latitude and longitude. With continuous information, values can be near each other, far from each other, or anywhere in between.

Refer now to FIG. 1, which illustrates, in block-diagram form, a hardware platform incorporating a representative, generalized embodiment of the invention. As indicated therein, the system includes a central-processing unit ("CPU") 100, which perform operations on and interacts with a main system memory 103 and components thereof. System memory 103 typically includes volatile or random-access memory ("RAM") for temporary storage of information, including buffers, executing programs, and portions of the computer's basic operating system. The platform typically also includes read-only memory ("ROM") for permanent storage of the computer's configuration and additional portions of the basic operating system, and at least one mass storage device 106, such a hard disk and/or CD-ROM drive. All components of the platform are interconnected by and communicate over, a bidirectional system bus 110.

The platform preferably also includes one or more sensors 113 for gathering environmental or physical information. Sensors 113 may include, for example, means for ascertaining the current geographical location of the platform (by means of a GPS circuit), local environmental or positional information (by means of an IR beacon, radio broadcast receiver, or transducer circuit), or the identities of individuals in the immediate area (by means of a receiver for IR-transmitting name tags, video face-recognition circuitry, or biometric-analysis circuitry (e.g., voice-print)). The operation of sensors 113 is regulated by a meta-information interface ("MII") 116, which also provides access to the information obtained by currently active sensors. In addition, MII 116 provides access to meta-information originated by the operating system, e.g., the date, the time of day, and the day of the week.

The user interacts with the platform by means of, for example, a keyboard 120 and/or a position-sensing device (such as a mouse) 123, and an output device 126 (a conventional display or, for example, audio output from headphones or an automobile dashboard speaker). It should be stressed, however, that these components need not take the form normally associated with desktop or laptop computers, since the invention is amenable to use with wearable data-processing equipment. Thus, display 126 may be an eyepiece projecting a virtual image instead of a CRT or flat-panel screen, and positionsensing device 123 may be a small hand-held sensor pad or a wireless mouse. Furthermore, the components of the platform need not reside within a single package. Again, given the varying architectures of actual and proposed wearable computing systems, different components may reside in different physical locations, linking to one another by wired network circuits or bodyborne electrical signals.

The main memory 103 contains a group of modules that control the operation of CPU 100 and its interaction with the other hardware components. These modules are implemented as executable machine instructions, running (by means of CPU 100) as active processes effectively capable of interacting (i.e., exchanging data and control commands) as illustrated. An operating system 130 directs the execution of low-level, basic system functions such as memory allocation, file management, and operation of mass storage devices 106. At a higher level, an analyzer module 133 directs execution of the primary functions performed by the invention, as discussed below; and instructions defining a user interface 136 allow straightforward interaction over display 126. User interface 136 generates words or graphical images on display 126 to facilitate user action and examination of documents, and accepts user commands from keyboard 120 and/or position-sensing device 123.

The current document (i.e., the file with which the user is interacting) resides document buffer 140. A document index buffer 143 contains a vectorized index of all candidate documents, which are themselves stored on mass storage device 106. Meta-information obtained from MII 116 is stored in a memory partition 146, and is used by analysis module 133 in performing searches of the index buffer 143 in accordance with the invention. Memory 103 may also contain a series buffers 150 for storing document templates, which are used by analysis module 133 to index and, possibly, to locate meta-information as discussed below. Again, the system may contain large numbers of templates stored on device 106, only some of which reside at any one time in buffers 150.

It must be understood that although the modules of main memory 103 have been described separately, this is for clarity of presentation only; so long as the system performs all necessary functions, it is immaterial how they are distributed within the system and the programming or hardware architecture thereof. Furthermore, while arrows indicate the operative relationships among the memory modules, and dashed arrows the relationships between memory modules and hardware components, the actual basis for communication is provided by operating system 130 and CPU 100.

Analysis module 133 first indexes all the documents in a corpus of data (which, again, are stored as files mass storage device 106, which is assumed for explanatory purposes to be a hard disk), and writes the indices to disk. Unlike the RA, the invention preferably keeps several vectors for each document. These include not only the wordvec vector for text (if any) in the document, but also vectors for meta-information, e.g., subject, people, time, date, day of week, location, etc.

Analysis module 133 indexes a document as follows:

1. Identification: Documents are broken into types based on a template file specific to the particular type of document. For example, an e-mail file includes the following recognition criteria:

Template plain_email
{
Recognize
   {anyorder {startline, "From: "}
      {startline, "Date: "}}
. . .

Because the invention is intended to search different kinds of documents, recognition criteria are used to indicate the manner in which particular kinds of files are organized to facilitate the search. For example, recognition criteria can set forth file organization, indicating the manner in which files are separated from one another. The recognition criteria can also indicate where specific pieces of meta-information (e.g., the date, subject, recipient, etc.) are located, as well as the location of document text. Recognition criteria for particular types of documents are contained in templates. The invention checks for the presence of a template matching a particular document type, and if one is found, the recognition criteria therein are employed. If no template is matched, the document is considered to be raw text. (If more than one template is matched, the first is used.)

2. After the document is identified, different fields are extracted, again based on the template. For example, the e-mail template continues:

Delimiter
   {startline, "From"}
Format
   {{anyorder {startline, "From: ", PERSON, "\n"}
      {startline, "Date: ", DATE, "\n"}
      optional {startline, "Subject: ", SUBJECT, "\n"}}
   "\n\n", BODY}
}
Bias 21100000

The delimiter command explicitly identifies the separator between one document of this template type and another, should they both reside in the same file. (For example, a plain e-mail archive may contain several pieces of mail in the same file, all separated by the word "From" plus a space at the start of a line.) The remainder of the template specifies that the "From:" line contains the person or people associated with this document. and the line starting with "Date:" contains the date/timestamp of the document.

Templates can also be employed during document creation, modification or storage to guide the acquisition of meta-information from MII 116 and its association with the document (the template typically being invoked in this situation by the application program responsible for creating the document). That is, a template field may point not to data within the document, but to meta-information acquired by MII 116 and/or sensors 113 that is to be stored with the document as part of its header. Suppose, for example, that the template for a document specifies a meta-information field indicating the geographic location where the document was created. Depending on the configuration of the system, that information may be continually acquired by a GPS sensor 113 and periodically placed in meta-information memory partition 146 by MII 116. Alternatively, GPS sensor 113 may be only intermittently active in response to a command issued by MII 116. In this case, the template instructs analysis module 133 to request a geographic location from MII 116, which in response activates the GPS sensor and loads the acquired value into partition 146. Numerous variations on these approaches are of course possible, combining varying frequencies of sensor activity, data acquisition and storage, as well user action. In this way, meta-information may be automatically associated with a document at appropriate junctures without distracting the user.

For indexing purposes, the template structure of the present invention may be similar to the templates used by the RA, but with a different interpretation. With the RA, the date and person information was only used to create the one-line summary. In accordance with the present invention, each type of meta-information is placed in its own vector, and a single vector represents each type of meta-information supported by the invention.

The final entry in the template file is the bias number for the particular type of file, which ranks the fields of the file in terms of importance. In the e-mail example above, the bias means that the body of the e-mail is most important, person and date fields are secondary (in a ratio 2 to 1 to 1), and no other fields are used to compute similarity.

3. Vectorization

Once information is parsed out of the document, it is encoded and vectorized. The encoding is as follows. The invention uses three integers to encode words (as cot pared with the two-integer wordcodes of the RA). Consequently, each character is 6 bits, with the most significant 6 bits in the first integer being the type field. Bits wrap to the next byte, as follows:

tttttt 111111 222222 333333 444444 55=32 bits
55555 666666 777777 888888 999999 0000
00 111111 222222 333333 444444 555555
=15 characters, 6 bits type

| Code | Type |
|------|------|
| 0x0  | Body |
| 0x1  | Text Location (descrete) |
| 0x2  | Subject |
| 0x3  | Person |
| 0x4  | Date |
| 0x5  | Time |
| 0x6  | Day |
| 0x7  | GPS Location (continuous) |

Characters are packed into a 6-bit packed representation:
   a–z=01–1A
   0–9=1B–24
   _=25
   -=26
   !=27

Anything else gets mapped to ascii(c) & 0x3F (lower 6 bits)

Day of week is simply encoded as a number, 0–7, plus the type bits. Date is encoded as type bits plus number of seconds since the epoch (Jan. 1, 1970, 12:00:01AM). Time of day is encoded as number of seconds since midnight, plus type, bits. Any meta-information that can be represented by text (e.g., subject lines, room names, people names, bodies of text, etc.) is encoded in accordance with the above scheme. Like the body of text, each word in these text strings is encoded seperately and added to a vector. Vectors of discrete (text) data are all stored in one file, but the vectors are still conceptually distinct and are distinguished by their type bits. The file format for discrete type information is the same as the wordvec file format. Non-discrete information is stored in its own separate file, in order to better search for information that is "close enough" to information in a query vector.

4. Determination of relevance

For each element of each discrete vector in a query—the generation and vectorization of which is described below—the algorithm used by the RA may be used to determine relevance to documents in the corpus. For "continuous" vectors (e.g., date, GPS location, etc.), the algorithm is modified to permit degrees of similarity, producing a value between 0.0 and 1.0. For example, for each date in the query's date vector, a binary search on the date_file is performed to find any dates within 24 hours of the query date. These are given a distance value based on how close—that is, how temporally proximate—the values are to the query date. These distance values are converted to weighted similarity, and are added to the similarity of the date vectors in the same way as in the discrete case.

5. Weighted addition of vectors

The result of the foregoing operations is a single similarity value for each type of meta-information. These values are associated with each document in the indexed corpus, and are used to compute the overall similarity using bias values for query and document types, by the following formula:

Query biases=bq pq sq lq dq etc. (i.e., body_query_bias, person_query_bias, etc.)

Index bias=bi pi si li di etc. (i.e., biases for this indexed document, gleaned from the template file)

Non-normalized biases=bq*bi pq*pi sq*si lq*li dq*di etc.

Normalized biases=bq*bi/M pq*pi/M sq*si/M lq*li/M dq*di/M etc.

where M=magnitude=(bq*bi+pq*pi+sq*si+lq*li+dq*di)

Each vector similarity is multiplied by its respective bias, and the resulting biased similarity is summed, to produce an overall similarity between zero and one.

Analysis module 133 preferably generates search queries autonomously from the current document in document buffer 140 or by reference to a current context. In the former case, analysis module 133 classifies the document either by its header or by reference to a template, and extracts the appropriate meta-information. In the latter case, the user's physical or interpersonal surroundings furnish the meta-information upon which the query is based. It is not necessary for the documents searched or identified to correspond in type to a current document. Furthermore, the query may not be limited to meta-information. Instead, the invention may utilize both a meta-information component (with relevance to candidate documents determined as discussed above) and a text component (with relevance determined in accordance with the RA). Analysis module 133 may also respond to queries provided by the user directly. For example, the user may specify a search in accordance with meta-information not ordinarily associated with the current document or the current surroundings, requesting, for example, a particular kind of document (or, indeed, any document generated) the last time the user was in or near a specified location.

The query is vectorized as described above in connection with the RA. Analysis module 133 supplies a ranked list of the most relevant documents, which may be continually, intermittently, or upon request presented to the user over display 126. If desired, or upon user command, the list may be pruned to include only documents whose relevance level exceeds a predetermined threshold.

It will therefore be seen that the foregoing represents a versatile and highly robust approach to document searching and recall. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for context-based document identification, the apparatus comprising:
   a. a database indexing a plurality of documents each in terms of meta-information specifying contextual information about the document;
   b. means for automatically acquiring current contextual information;
   c. a search facility for searching the database to identify documents whose meta-information comprises information relevant to the acquired current contextual information; and
   d. a display for reporting the identified documents to the user.

2. The apparatus of claim 1 wherein the meta-information comprises at least one of (a) a user location, (b) time of day, (c) day of week, (d) date, and (e) subject.

3. The apparatus of claim 1 wherein the meta-information comprises identification of a person associated with the document.

4. The apparatus of claim 1 wherein the means for acquiring current contextual information comprises an environmental sensor.

5. The apparatus of claim 4 wherein the environmental sensor is a global-positioning system.

6. The apparatus of claim 1 wherein the means for acquiring current contextual information comprises means for identifying a nearby individual.

7. The apparatus of claim 1 further comprising a system clock, the means for acquiring current contextual information being connected to the system clock and deriving contextual information therefrom.

8. The apparatus of claim 1 wherein at least some of the meta-information is continuous, the searching means automatically and continuously identifying relevant information based on proximity of the meta-information to the current contextual information.

9. The apparatus of claim 1 wherein at least some of the meta-information is discrete, the searching means identifying relevant information based on an exact match between the meta-information and the current contextual information.

10. The apparatus of claim 1 further comprising means for adding new documents to the database, said means comprising:
    a. a plurality of document templates, each template corresponding to a document type and specifying contextual information within the document; and
    b. an analyzer for (i) matching a new document to a template and, in accordance with the template, extracting contextual information from the document, and (ii) indexing the document within the database in terms of the extracted contextual information.

11. The apparatus of claim 1 wherein the meta-information is represented in the database as vectors, each vector corresponding to a document and to a type of contextual information associated therewith and having a value representative of the associated contextual information.

12. The apparatus of claim 11 wherein the current contextual information is represented as a vector, the searching means determining relevance based on the current contextual-information vector and the vectors in the database.

13. The apparatus of claim 1 wherein the means for acquiring current contextual information comprises user-responsive means for accepting user-provided contextual information.

14. The apparatus of claim 1 further comprising means for storing a current document, the means for acquiring current contextual information comprising means for analyzing the current document for contextual information and extracting the contextual information therefrom.

15. A method of identifying documents from a stored document database in response to contextual information, the method comprising the steps of:
    a. indexing each stored document in terms of meta-information specifying contextual information about the document;

b. automatically acquiring current contextual information;

c. identifying stored documents whose meta-information comprises information relevant to the acquired current contextual information; and d. reporting the located documents to the user.

16. The method of claim 15 wherein the meta-information comprises at least one of (a) a user location, (b) time of day, (c) day of week, (d) date, and (e) subject.

17. The method of claim 15 wherein the meta-information comprises identification of a person associated with the document.

18. The method of claim 15 wherein at least some of the meta-information is continuous, relevant information being automatically and continuously identified based on proximity of the meta-information to the current contextual information.

19. The method of claim 15 wherein at least some of the meta-information is discrete, relevant information being identified based on an exact match between the meta-information and the current contextual information.

20. The method of claim 15 further comprising the step of adding new documents to the database according to substeps comprising:

a. defining a plurality of document templates, each template corresponding to a document type and specifying contextual information within the document;

b. matching a new document to a template and, in accordance with the template, extracting contextual information from the document; and c. indexing the document within the database in terms of the extracted contextual information.

21. The method of claim 15 further comprising the step of representing the meta-information as vectors, each vector corresponding to a document and to a type of contextual information associated therewith and having a value representative of the associated contextual information.

22. The method of claim 21 wherein the current contextual information is represents as a vector, relevance being determined in accordance with the current contextual information vector and the vectors in the database.

23. The method of claim 15 wherein the current contextual information is acquired from a user.

24. The method of claim 15 wherein current contextual information is acquired from a current document.

* * * * *